US011683582B2

(12) United States Patent
Matsumura

(10) Patent No.: US 11,683,582 B2
(45) Date of Patent: Jun. 20, 2023

(54) IMAGING APPARATUS, METHOD FOR CONTROLLING IMAGING APPARATUS, AND STORAGE MEDIUM

(71) Applicant: CANON KABUSHIKI KAISHA, Tokyo (JP)

(72) Inventor: Koichi Matsumura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/694,976

(22) Filed: Mar. 15, 2022

(65) Prior Publication Data

US 2022/0303461 A1   Sep. 22, 2022

(30) Foreign Application Priority Data

Mar. 22, 2021   (JP) .............................. JP2021-047468

(51) Int. Cl.
*H04N 23/60*        (2023.01)
(52) U.S. Cl.
CPC ........... *H04N 23/64* (2023.01); *H04N 23/665* (2023.01)
(58) Field of Classification Search
CPC .................. H04N 5/23222; H04N 5/23227
See application file for complete search history.

(56) References Cited

U.S. PATENT DOCUMENTS

| 10,868,972 B2 | 12/2020 | Sugawara |  |
|---|---|---|---|
| 2020/0252532 A1* | 8/2020 | Shimokawa | ....... H04N 5/23254 |
| 2021/0227116 A1* | 7/2021 | Kaizu | .................... H04N 5/353 |

FOREIGN PATENT DOCUMENTS

| JP | 2019-212989 A | 12/2019 |
| JP | 2020-010317 A | 1/2020 |

* cited by examiner

*Primary Examiner* — Ahmed A Berhan
(74) *Attorney, Agent, or Firm* — Cowan, Liebowitz & Latman, P.C.

(57) ABSTRACT

An imaging apparatus according to the present invention includes an imaging element and a controller configured to detect presence/absence of a flicker. The controller performs control such that light receiving units of predetermined rows of different groups in a plurality of groups acquired by dividing a pixel area into predetermined numbers of rows accumulate the electric charges for a unit time shorter than a flicker period in accumulation periods of the same timing, the light receiving units of a plurality of different rows of the same group in the plurality of groups accumulate the electric charges for the unit time in accumulation periods of mutually-different timings, and a total time of the accumulation periods in which the light receiving units of the plurality of different rows of the same group accumulate the electric charges is a predetermined time longer than the flicker period.

12 Claims, 15 Drawing Sheets

| COUNTER OUTPUT | ENCODER OUTPUT | | | | | | |
|---|---|---|---|---|---|---|---|
| cnt | enc[0] | enc[1] | enc[2] | ... | enc[11] | enc[12] | enc[13] | ... |
| 0 | ON | OFF | OFF | | OFF | ON | OFF | |
| 1 | OFF | ON | OFF | | OFF | OFF | ON | |
| 2 | OFF | OFF | ON | | OFF | OFF | OFF | |
| ⋮ | | | | | | | | |
| 11 | OFF | OFF | OFF | | ON | OFF | OFF | |

IMAGING APPARATUS, METHOD FOR CONTROLLING IMAGING APPARATUS, AND STORAGE MEDIUM

BACKGROUND OF THE INVENTION

Field of the Invention

The present invention relates to an imaging apparatus represented by a digital camera and, more particularly, to an imaging apparatus, a control method, and a storage medium relating to detection of a change in the quantity of external light generated at the time of imaging (generally, referred to as a flicker).

Description of the Related Art

In the related art, it is known that a so-called flicker that is a change in the quantity of light with a predetermined period is generated in an artificial light source such as a fluorescent lamp. Japanese Patent Laid-Open No. 2020-010317 discloses a technology for acquiring a plane average of each image by repeating accumulation and reading at a high speed and detecting presence/absence and a frequency of a flicker on the basis of the acquired plane average value. In addition, Japanese Patent Laid-Open No. 2019-212989 discloses a technology for imaging a still screen without being influenced by the effect of a flicker on the basis of the frequency of the detected flicker.

However, the related art disclosed in the documents described above is for the purpose of detecting a flicker frequency (100 Hz to 120 Hz) of a fluorescent lamp that is conventionally known. For this reason, high frequency flickers (about 800 Hz to 1000 Hz) generated under recent LED light sources cannot be detected.

In addition, as an extension of the related art disclosed in the documents described above, in a case in which a high-frequency flicker generated under a high-frequency light source such as a LED is detected, it is necessary to repeat exposure with a period shorter than a conventional period. In this case, in order to read images at a high speed, there is a problem in that a load on a transmission band increases. Meanwhile, in a case in which the transmission band is limited, the amount of information which is transmitted is decreased, and there is a problem in that a detection accuracy is degraded. In addition, since exposure and reading are repeated with a short period, there is a problem in that it is difficult to perform program control.

SUMMARY OF THE INVENTION

The present invention is in view of the problems described above, and an object thereof is to provide an imaging apparatus detecting a high-frequency flicker with a small number of times of exposure and reading.

In order to achieve the object described above, an imaging apparatus according to the present invention includes: an imaging element configured to have a pixel area in which a plurality of unit pixels each including a light receiving unit accumulating electric charges in accordance with an amount of received light and an electric charge holding unit holding the electric charges accumulated by the light receiving unit are arranged in a matrix pattern; and a controller configured to detect presence/absence of a flicker in a captured image on the basis of image data output from the imaging element, in which the controller performs control such that the light receiving units of predetermined rows of different groups in a plurality of groups acquired by dividing the pixel area into predetermined numbers of rows accumulate the electric charges for a unit time shorter than a flicker period in accumulation periods of the same timing, the light receiving units of a plurality of different rows of the same group in the plurality of groups accumulate the electric charges for the unit time in accumulation periods of mutually-different timings, and a total time of the accumulation periods in which the light receiving units of the plurality of different rows of the same group accumulate the electric charges is a predetermined time longer than the flicker period.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. The embodiments described below are not for limiting the present invention relating to the scope of the claims, and not all combinations of features described in the embodiments are essential as solving means of the present invention.

First Embodiment

Figure 1:
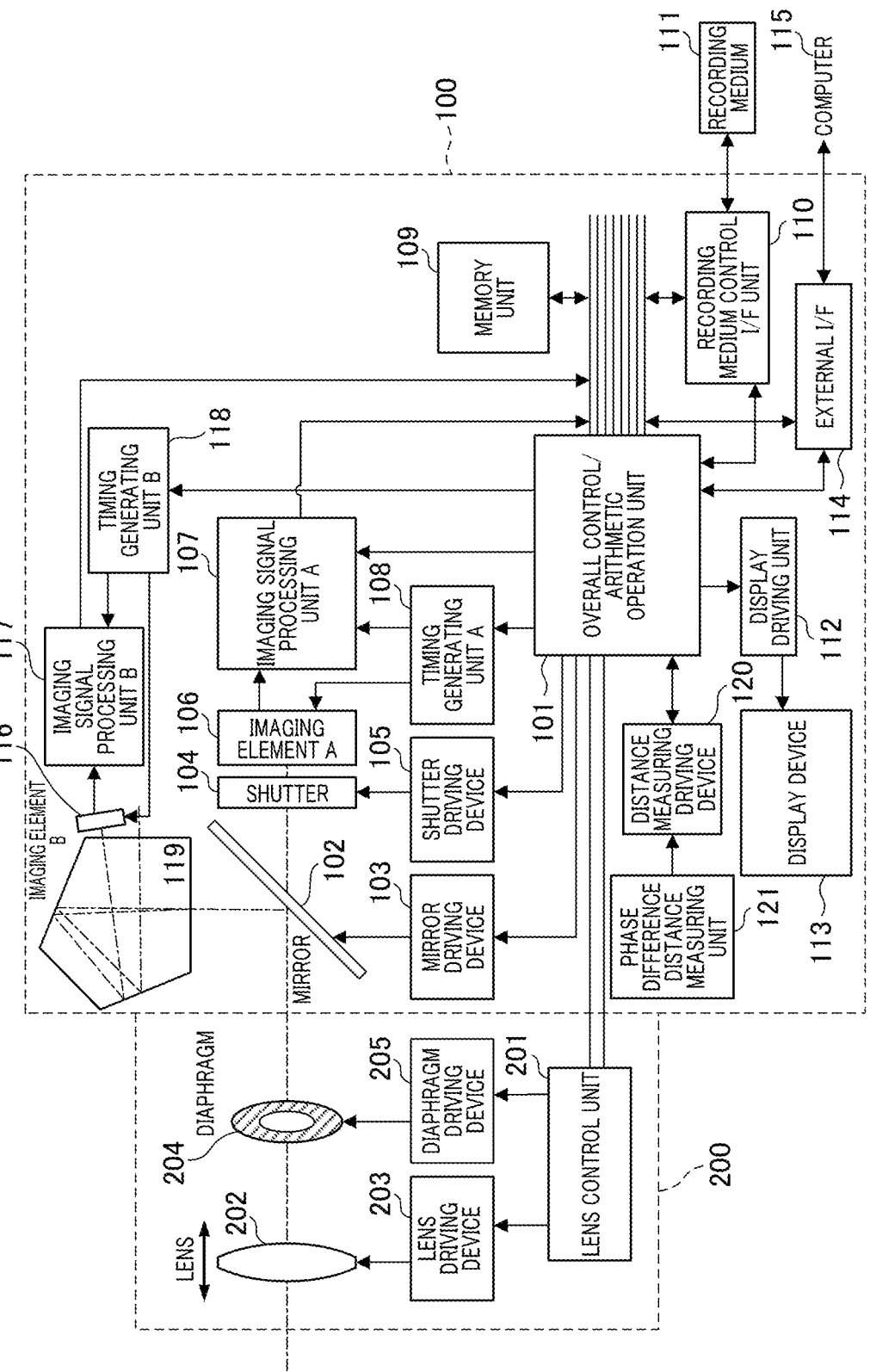
FIG. 1 is a block diagram illustrating a schematic configuration of an imaging apparatus.
Figure 2:
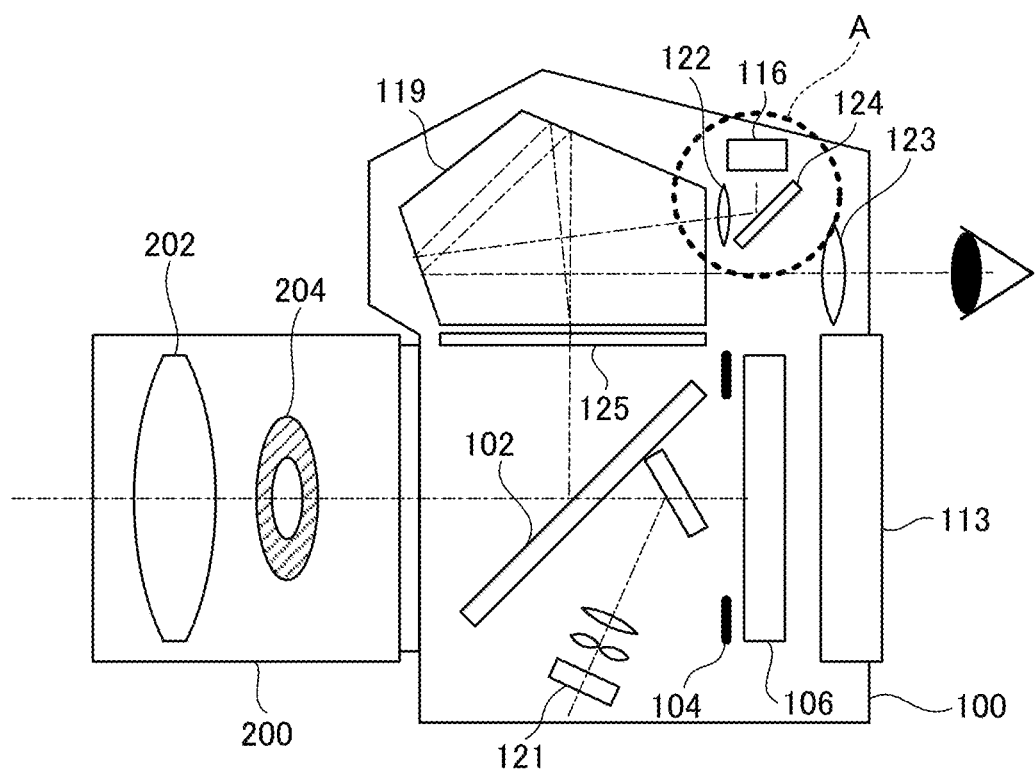
FIG. 2 is a layout diagram of blocks, which are illustrated in FIG. 1, of an actual imaging apparatus.

FIG. 1 is a block diagram illustrating a schematic configuration of an imaging apparatus. FIG. 2 is a layout diagram of blocks, which are illustrated in FIG. 1, of an actual imaging apparatus. In this embodiment, a digital single lens reflex camera will be described as an example of the imaging apparatus.

As illustrated in FIGS. 1 and 2, an interchangeable lens 200 that is an interchange-type lens can be mounted in the digital single lens reflex camera 100 (the imaging apparatus). An overall control/arithmetic operation unit 101 (controller) integrally controls the digital single lens reflex camera 100 and the interchangeable lens 200.

An imaging lens 202 forms an optical image of a subject in an imaging element A 106. A lens driving device 203 drives the imaging lens such that the focus (a focal point) is matched. A diaphragm mechanism 204 controls a quantity of reflected light from a subject image passing through the lens. A diaphragm driving device 205 drives the diaphragm mechanism 204.

The interchangeable lens 200 for photographing can be detached from the digital single lens reflex camera 100. In addition, communication for exchange of information is performed between the interchangeable lens 200 and the digital single lens reflex camera 100. The overall control/arithmetic operation unit 101 of the digital single lens reflex camera 100 and a lens control unit 201 of the interchangeable lens 200 perform the communication at this time and manage mutual transmission/reception.

When a finder is used, a mirror 102 guides an optical image that has passed through the imaging lens 202 to the finder and an AE imaging element B (an AE sensor) 116. In addition, when photographing is performed, an optical image is guided to an imaging element A 106 in accordance with jump-up of the mirror 102. Generally, the mirror 102 is called a quick return (QR) mirror. A mirror driving device 103 drives the mirror 102.

A shutter 104 is a shutter mechanism having shutter curtains corresponding to front curtain/rear curtain of a focal plane type and performs control of an exposure time of an optical image that has passed through the imaging lens 202 and light shielding. A shutter driving device 105 drives the shutter 104.

The imaging element A 106 is a solid-state imaging element used for taking in an optical image of a subject formed by the imaging lens 202 as an image signal. The imaging element A 106 according to this embodiment, for example, is an imaging element of a two-dimensional XY address scanning type like a CMOS image sensor. The imaging element is configured to be able to simultaneously accumulate electric charge in a plurality of lines by controlling an electric charge accumulation time for each of the lines by designating an address.

An imaging signal processing unit A 107 performs various processes on image data output from the imaging element A 106. The various processes include an image data amplifying process, various correction processes such as a defect correction for image data and the like, an image data compression process, and the like.

A timing generating unit A 108 outputs various timing signals to the imaging device A 106 and the imaging signal processing unit A 107. The overall control/arithmetic operation unit 101 detects presence/absence of a flicker included in a captured image on the basis of image data that is output from the imaging element A 106 and is processed by the imaging signal processing unit A 107.

A memory unit 109 temporarily stores image data and the like processed by the imaging signal processing unit A 107 and permanently stores various adjustment values and a program and the like for performing various kinds of control according to the overall control/arithmetic operation unit 101. A recording medium control interface (I/F) unit 110 performs a process of recording image data and the like on a recording medium 111 or performs a process of reading image data and the like from the recording medium 111.

The recording medium 111 is a recording medium that is detachably attached to the digital single lens reflex camera 100 and is composed of a semiconductor memory or the like recording various kinds of data such as image data and the like. A display driving unit 112 drives a display device 113 that displays a still screen image, a moving image, and the like that have been captured. An external interface (I/F) 114 exchanges information such as an image signal, a control signal, and the like with an external device such as a computer 115.

An imaging element B 116 acquires an AE signal (a light source detection signal). The imaging element B 116 is a sensor of an RGB imager type, and an image sensor of a CCD or a CMOS is used in this embodiment. As illustrated in FIG. 2, image light that has passed through the imaging lens 202 of the interchangeable lens 200 is reflected by the mirror 102, is spectrally dispersed by a spectral unit 125, and is input to a pentagonal prism 119. The pentagonal prism 119 guides light rays bent by the mirror 102 to the finder 123 and the lens 122. Light condensed by the lens 122 is reflected by the mirror 124 and is incident to the imaging element B 116 (see an A part illustrated in FIG. 2).

Referring back to FIG. 1, an imaging signal processing unit B 117 performs various processes on an image signal output from the imaging element B 116. The various processes include an image signal amplification process, an A/D conversion process performing conversion from analog to digital, various correction processes such as a defect correction for image data after A/D conversion and the like, a compression process for compressing image data, and the like. A timing generating unit B 118 outputs various timing signals to the imaging element B 116 and the imaging signal processing unit B 117.

A phase difference distance measuring unit 121 (an AF sensor) is a distance measuring unit according to a phase difference type and acquires one pair of images of which phases are changed from the phase of a light beam transmitted through the mirror 102 of a translucent type. The phase difference distance measuring unit 121 calculates a defocusing amount of a subject from an amount of deviation of the one pair of images and moves the imaging lens 202. A distance measuring driving device 120 drives the phase difference distance measuring unit 121.

Figure 3:
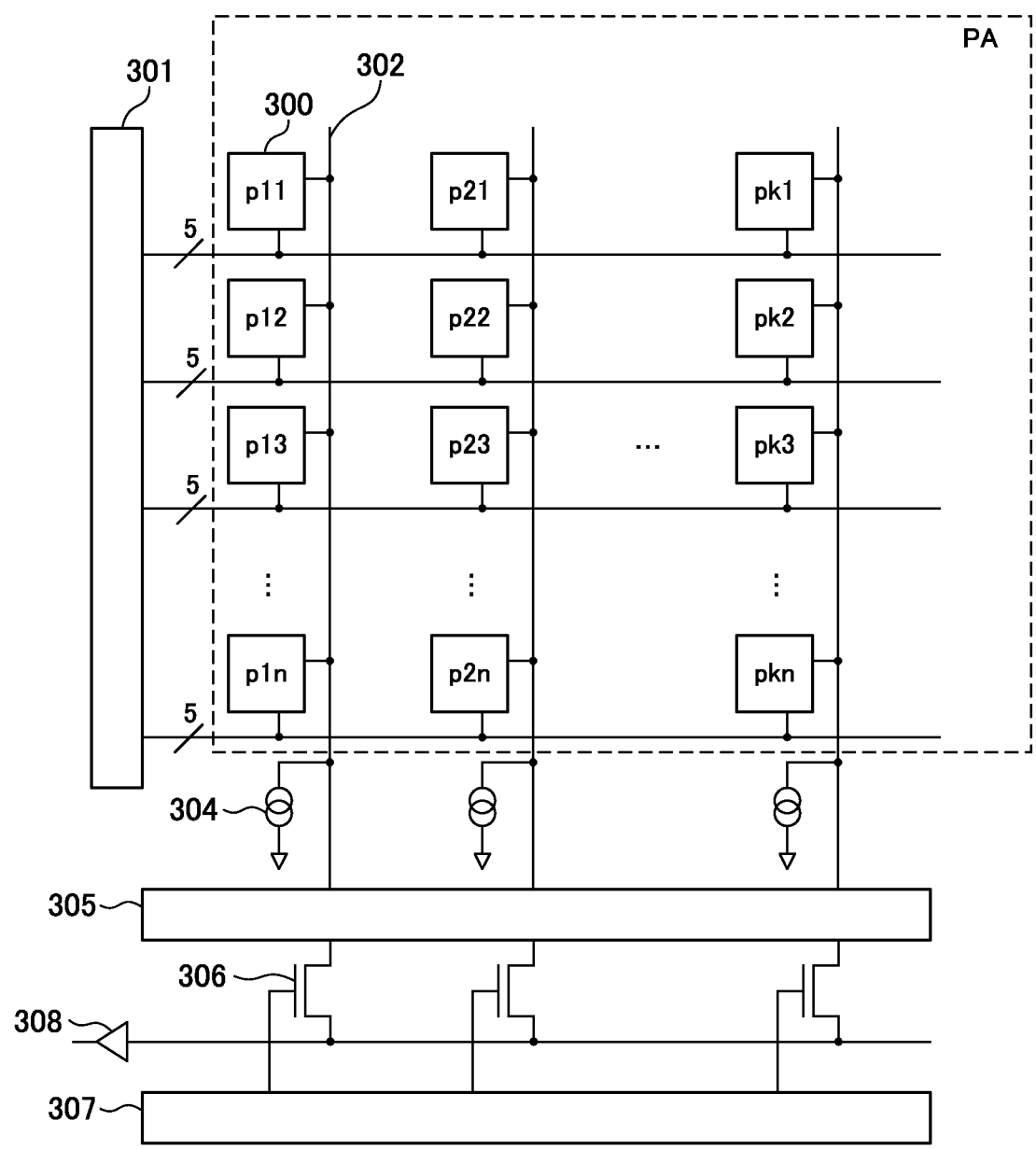
FIG. 3 is a schematic configuration diagram of a solid-state imaging element included in the imaging apparatus.

FIG. 3 is a schematic configuration diagram of a solid-state imaging element A 106 included in the imaging apparatus. A pixel area PA is a pixel area of the imaging element A 106. In the pixel area PA, a plurality of unit pixels 300 are arranged in a two-dimensional shape (a matrix pattern) over a plurality of rows and a plurality of columns such as p11 to pkn. The unit pixel 300 includes a light receiving unit generating and accumulating electric charges in accordance with the amount of received light and an electric charge holding unit holding the above-described electric charges generated and accumulated in the light receiving unit.

Figure 4:
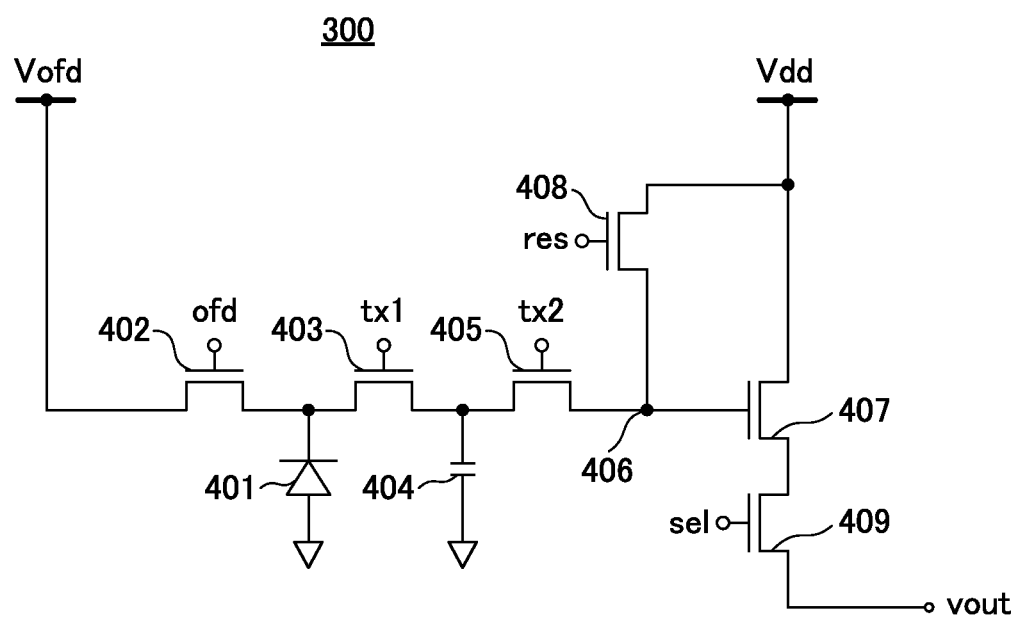
FIG. 4 is a circuit configuration diagram of a unit pixel (one pixel) of an imaging element according to a first embodiment.

Here, the circuit configuration of the unit pixel 300 (one pixel) will be described with reference to FIG. 4. FIG. 4 is a circuit configuration diagram of the unit pixel 300 (one pixel) of the imaging element according to the first embodiment. A photodiode (PD) 401 of the pixel performs photoelectric conversion of an incident optical signal (optical image) and accumulates electric charge corresponding to an amount of exposure. In a case in which a control signal tx1 becomes a high level, a transmission switch 403 transmits electric charge accumulated in the PD 401 to a MEM unit 404. The MEM unit 404 is an electric charge holding unit used for temporarily holding electric charge accumulated in the PD 401.

In a case in which a control signal tx2 becomes the high level, a transmission switch 405 transmits electric charge maintained in the MEM unit 404 in a floating diffusion unit (FD unit) 406. The FD unit 406 is connected to a gate of an amplifier 407 and converts an amount of electric charge transmitted from the PD 401 into a voltage quantity.

An FD reset switch 408 is a switch used for resetting the FD unit 406. In a case in which a control signal res becomes the high level, the FD reset switch 408 resets the FD unit 406. In addition, in a case in which a control signal ofd becomes the high level, a reset switch 402 becomes on. In accordance with this, the electric charge of the PD 401 is reset. In a case in which a control signal sel becomes the high level, a pixel selection switch 409 outputs a pixel signal that has been converted into a voltage by the FD and has been amplified by the amplifier 407 to an output vout of the unit pixel 300 (pixel).

Referring back to FIG. 3, a vertical scanning circuit 301 supplies control signals such as signals ofd, res, tx1, tx2, and sel controlling transistors of each unit pixel 300 to the unit pixel 300. Such control signals are common for each row of the pixel area PA. Control signals of an n-th scanning line (hereinafter referred to as an n-th line) that has been elected to be scanned by the vertical scanning circuit 301 will be denoted as φFDn, φRESn, φTX1n, φTX2n, and φSELn. In addition, in order to avoid confusion, sign "_" will be used as necessary in the following description. For example, a control signal φTX1 of an 2n-th row may be denoted as "φTX1_2n".

An output vout of each pixel is connected to a column common reading circuit 305 through a vertical output line 302 for each column. The vertical output line 302 is disposed for each column, and outputs vout of the unit pixels 300 corresponding to one column are connected thereto. A current source 304 is connected to the vertical output line 302, and a source follower circuit is configured using the current source 304 and the amplifiers 407 of the unit pixels 300 connected to the vertical output line 302.

Outputs of the column common reading circuits 305 are connected to horizontal transmission switches 306. The horizontal transmission switch 306 is a switch for selecting pixel data (a pixel signal) read from the column common reading circuit 305 and is driven by a horizontal scanning circuit 307. The pixel data selected by the horizontal scanning circuit 307 is amplified by an output amplifier 308 and is output from the imaging element A 106.

Figures 5A, 5B:
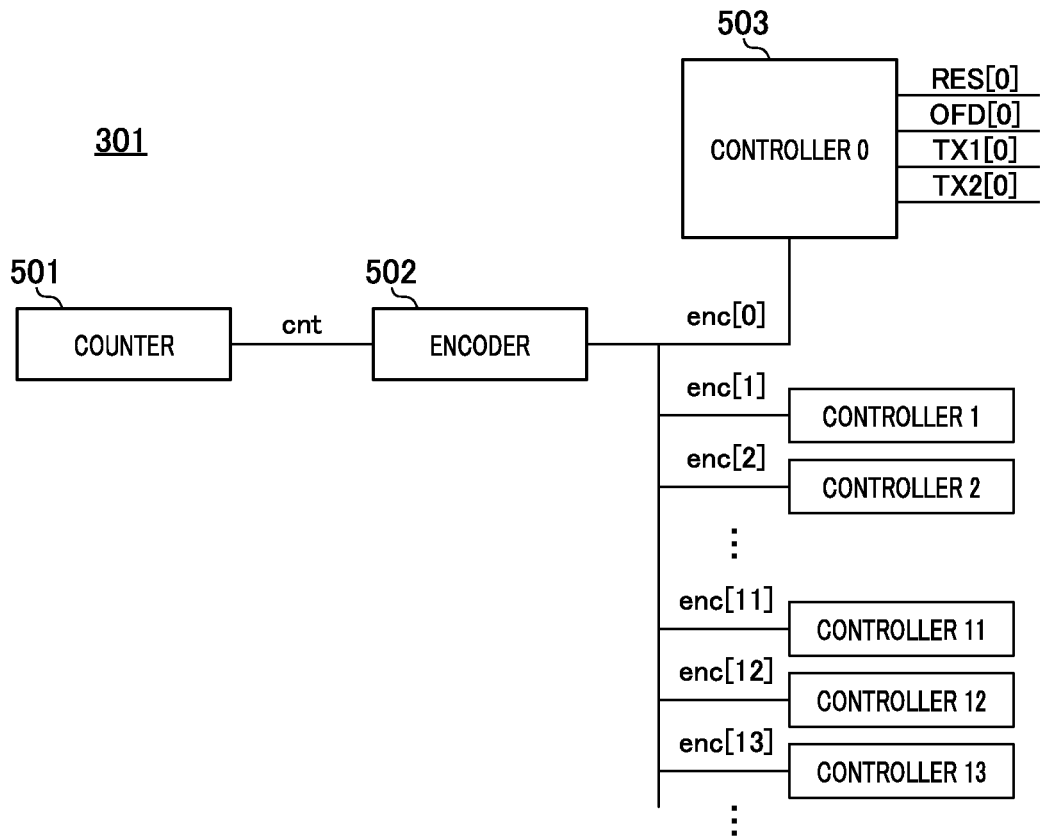
FIGS. 5A and 5B are explanatory diagrams of a part of the circuit configuration of a vertical scanning circuit.

FIGS. 5A and 5B are explanatory diagrams of a part of the circuit configuration of the vertical scanning circuit 301. FIG. 5A is a circuit configuration diagram of (a part of) the vertical scanning circuit 301, and FIG. 5B is a chart 504 illustrating an example of counter output and encoder outputs according to this embodiment. A counter 501 generates a count value cnt from input clocks. The generated count value cnt is input to an encoder 502.

The encoder 502 generates an on/off switching control signal enc[n] for each scanning line on the basis of the count value cnt. The generated control signal enc[n] is input to a control unit controller n503 for each scanning line. The scanning line controlled to be on outputs the control signals called φFDn, φRESn, φTX1n, φTX2n, and φSELn described above. The scanning line controlled to be off does not output the control signals described above.

The chart 504 of FIG. 5B illustrates an example of encoder outputs in a case in which a control signal is turned on for every 12 lines by shifting a phase for each one count.

For a counter output 0, encoder outputs enc[12n] (here, n=0, 1, 2, . . . ) are on, and the others are off. In accordance with this, the controllers 12n (here, n=0, 1, 2, . . . ) are controlled to be on. Then, control signals φFD12n, φRES12n, φTX1_12n, φTX2_12n, and φSEL12n (here, n=0, 1, 2, . . . ) are output from the vertical scanning circuit 301.

For a counter output 1, encoder outputs enc[12n+1] (here, n=0, 1, 2, . . . ) are on, and the others are off. In accordance with this, the controllers 12n+1 (here, n=0, 1, 2, . . . ) are controlled to be on. Then, control signals φFD12n+1, φRES12n+1, φTX1_12n+1, φTX2_12n+1, and φSEL12n+1 (here, n=0, 1, 2, . . . ) are output from the vertical scanning circuit 301.

As described above, in the example illustrated in FIG. 5B, when the counter output is m, the controllers 12n+m (here, n=0, 1, 2, . . . ) are controlled to be on. Then, control signals φTX1_12n+m, φFD12n+m, φRES12n+m, φTX2_12n+m, and φSEL12n+m (here, n=0, 1, 2, . . . ) are output. In FIG. 5A, the circuit configuration of the vertical scanning circuit as described above is illustrated. Here, the number of skips of phases and the number of skips of scanning lines controlled to be on at the same timing are arbitrary, and those illustrated in FIG. 5B are merely examples.

Figure 6:
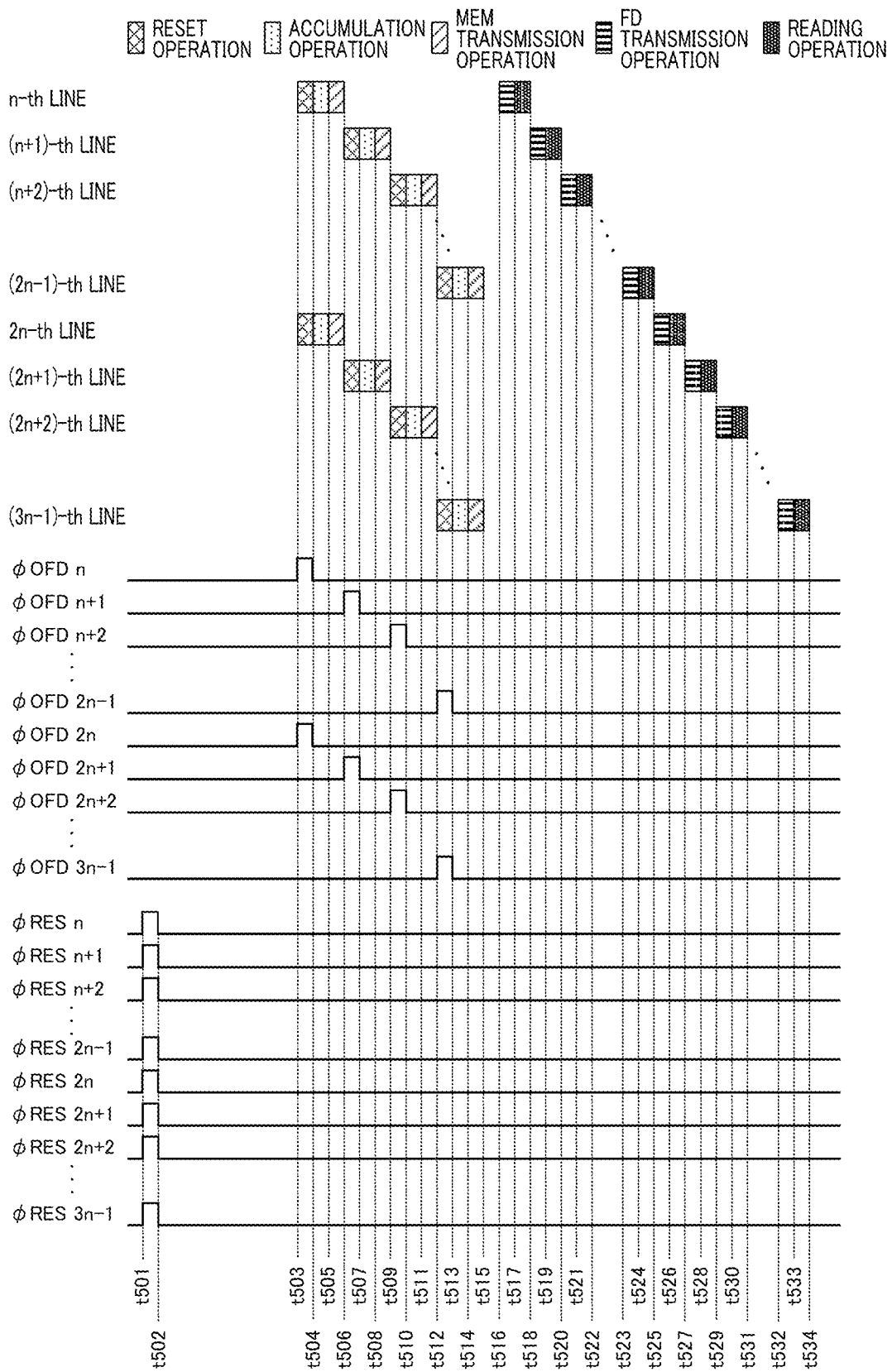
FIG. 6 is a timing diagram of a method of driving an imaging element according to the first embodiment.
Figure 7:
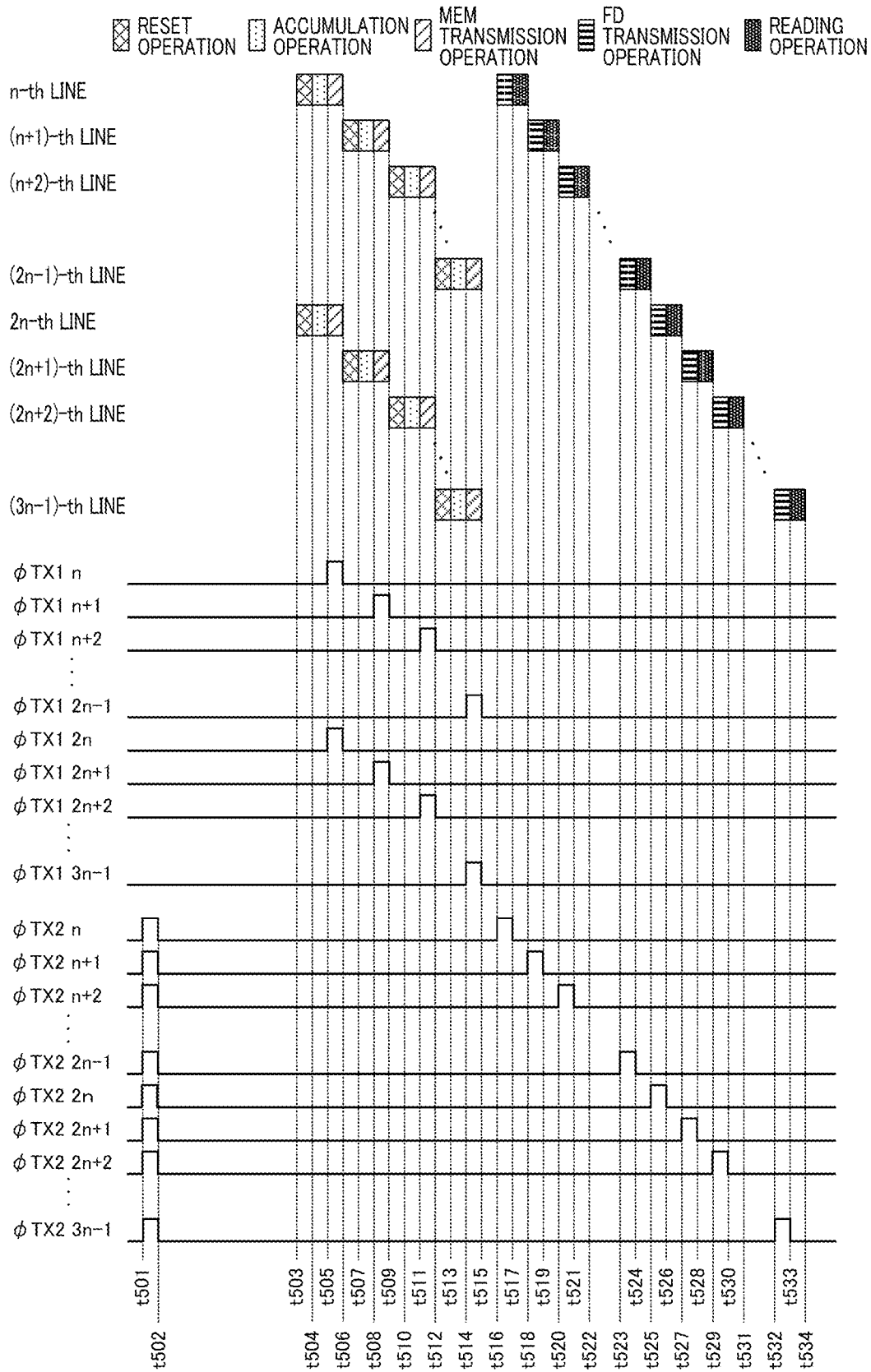
FIG. 7 is a timing diagram of a method of driving an imaging element according to the first embodiment.
Figure 8:
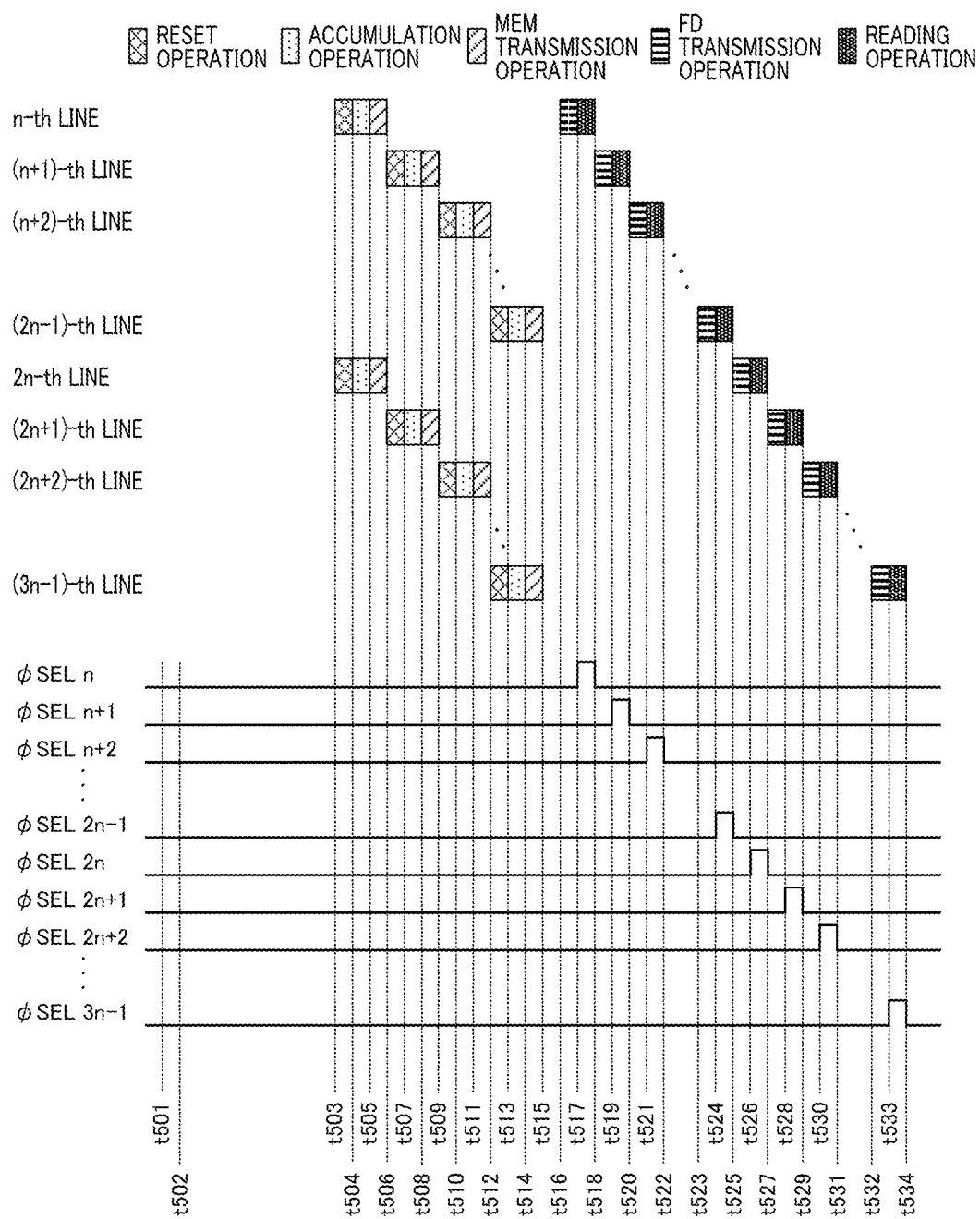
FIG. 8 is a timing diagram of a method of driving an imaging element according to the first embodiment.

Next, operations of the imaging element A 106 according to a driving system of this embodiment from start of accumulation of electric charge to reading of image data will be described with reference to FIGS. 6 to 8. FIGS. 6 to 8 are timing diagrams of a method of driving an imaging element according to the first embodiment, FIG. 6 illustrates control signals φFD and φRES, FIG. 7 illustrates control signals φTX1 and φTX2, and FIG. 8 illustrates a control signal φSEL. The driving system according to this embodiment causes each pixel to perform an accumulation operation of a global shutter system in the same period for predetermined rows. In this embodiment, the predetermined rows are assumed to be n row. A number used for n is a natural number.

Between times t501 and t502, pulses of the control signals φRES and φTX2 of all the lines are applied, and the transmission switch 405 and the reset switch 408 become on. In accordance with this, unnecessary electric charge accumulated in the MEM units 404 and the FD units 406 of all the lines is eliminated, and a reset operation is performed.

At the time t502, application of the pulses of the control signals φRES and φTX2 is released, and the transmission switch 405 and the reset switch 408 become off.

Between times t503 and t504, pulses of the control signals φFDn and φFD2n are applied, and the reset switch 402 becomes on.

At the time t504, application of the pulses of the control signals φFDn and φFD2n is released, the reset switch 402 becomes off, and an operation of accumulating electric charge generated in the PDs 401 of the n-th line and the 2n-th line starts.

Between times t505 and t506, pulses of control signals φTX1_n and φTX1_2n are applied, the transmission switch 403 becomes on, and a MEM transmission operation of transmitting electric charge accumulated in the PD 401 to the MEM unit 404 is performed.

Between times t506 and t507, pulses of control signals φOFDn+1 and φFD2n+1 are applied, and the reset switch 402 becomes on.

At the time t507, application of the pulses of control signals φFDn+1 and φFD2n+1 is released, the reset switch 402 becomes off, and an operation of accumulating electric charge generated in the PDs 401 of the (n+1)-th line and the (2n+1)-th line starts.

Between times t508 and t509, pulses of control signals φTX1_n+1 and φTX1_2n+1 are applied, the transmission switch 403 becomes on, and a MEM transmission operation of transmitting electric charge accumulated in the PD 401 to the MEM unit 404 is performed.

Between times t509 and t510, pulses of control signals φFDn+2 and φFD2n+2 are applied, and the reset switch 402 becomes on.

At the time t510, application of the pulses of the control signals φFDn+2 and φFD2n+2 is released, the reset switch 402 becomes off, and an operation of accumulating electric charge generated in the PDs 401 of the (n+2)-th line and the (2n+2)-th line starts.

Between times t511 and t512, pulses of control signals φTX1_n+2 and φTX1_2n+2 are applied, the transmission switch 403 become on, and a MEM transmission operation of transmitting electric charge accumulated in the PD 401 to the MEM unit 404 is performed.

By repeating the operations described above from the n-th line to the (2n−1)-th line, driving for accumulating electric charge in the same period for every predetermined lines and accumulating electric charge in a different period for each line can be realized.

Next, reading of electric charge transmitted to the MEM unit 404 in the driving described above is performed. First, in the n-th line, electric charge transmitted to the MEM unit 404 is read.

Between times t516 and t517, a pulse of the control signal φTX2_n is applied, the transmission switch 405 becomes on, and an FD transmission operation of transmitting electric charge maintained in the MEM unit 404 to the FD 406 is performed.

After the end of the FD transmission operation of the n-th line, between times t517 and t518, a pulse of a control signal φSELn is applied, and the selection switch 409 becomes on. In accordance with this, the electric charge maintained in the FD 406 is converted into a voltage, is output to a reading circuit as pixel data (a pixel signal), and is sequentially output by the horizontal scanning circuit 307. Then, reading of pixel data from pixels in the n-th line is completed.

By repeating the operations described above from the n-th line to the (3n−1)-th line, sequential reading of pixel data is completed.

Figure 9:
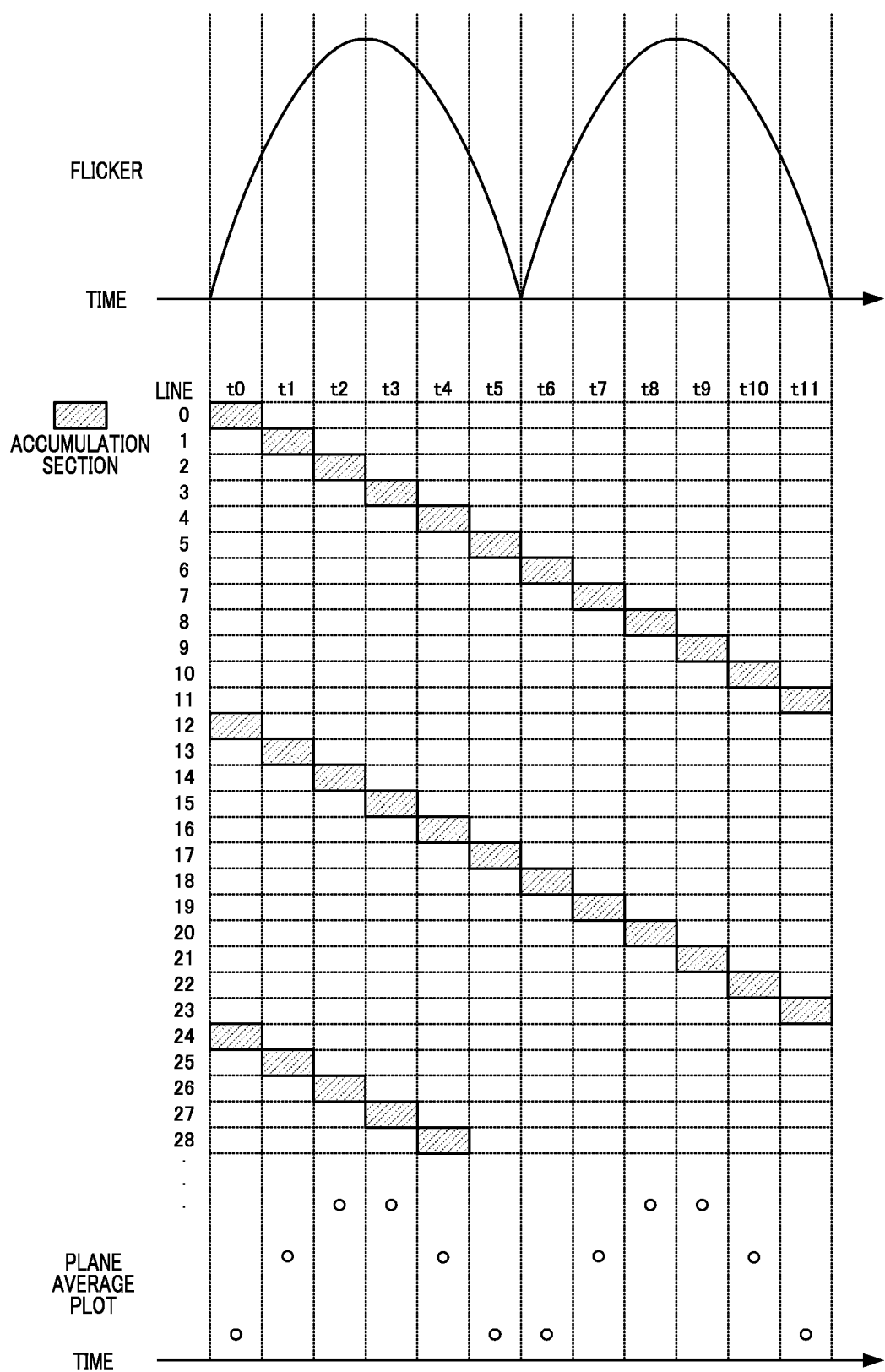
FIG. 9 is a diagram illustrating a plot of change in the quantity of light of a flicker, an accumulation timing, and a plane average value according to the first embodiment.

FIG. 9 is a diagram illustrating a plot of a change in the quantity of light of a flicker, an accumulation timing, and a plane average value according to the first embodiment. As illustrated in FIGS. 6 to 8, in this embodiment, electric charge is accumulated in accumulation periods of the same timing in a plurality of lines of every n lines in a global shutter system, and electric charge is accumulated in accumulation periods of different timings for each line within n lines. FIG. 9 illustrates a case in which electric charge is accumulated in accumulation periods of the same timing in a plurality of lines of every 12 lines. The accumulation periods are t0 to t11, and accumulation times are the same and are assumed to be t seconds (a unit time).

Here, a plane average represents an average value of outputs (measured light values) of image signals corresponding to a plurality of lines accumulated in a predetermined accumulation period. For example, the plane average represents an average value of outputs of image signals of a plurality of lines accumulated in t seconds that represent a unit time. Here, the unit time is a time shorter than a flicker period that is a detection target.

On the other hand, a total time (predetermined time) of the accumulation periods t0 to t11 is a time longer than a flicker period that is a detection target. In addition, the predetermined time is a time that is an integer multiple of the unit time and is preferably a time that is twice or more of the flicker period that is a detection target. In a case in which the predetermined time is a time shorter than twice the flicker period that is a detection target, it is preferable to accumulate electric charges over a plurality of frames.

Lines 12n such as line 0, line 12, line 24, and the like are lines corresponding to each other in different groups, and these perform accumulation of electric charge in the accumulation period t0. An average value of exposure results corresponding to a plurality of lines acquired by accumulating electric charge in this accumulation period t0 is acquired as a plane average value AE(0).

Next, lines 12n+1 such as line 1, line 13, line 25, and the like are lines corresponding to each other in different groups, and these perform accumulation of electric charge in the accumulation period t1. An average value of exposure results corresponding to a plurality of lines acquired by accumulating electric charge in this accumulation period t1 is acquired as a plane average value AE(1). In this way, when electric charges is accumulated in the accumulation period t1 different from the accumulation period t0, in accumulation periods adjacent to each other such as the accumulation period t0 and the accumulation period t1, electric charges of rows (lines) of unit pixels 300 adjacent to each other is accumulated.

By repeating the accumulation of electric charge, the reading process, and the average value process described above, AE(0) to AE(11) are acquired. An evaluation value used for determining a period (frequency) of changes in the light quantity of the flicker is calculated from these AE(0) to AE(11). In this embodiment, an evaluation value used for determining a period of changes in the light quantity of the flicker is defined using the following Equation (1).

$$SAD(m) = \sum_{i=0}^{5} |AE(n) - AE(n+m)| \tag{1}$$

In Equation (1), an SAD is an abbreviation of Sum of Absolute Difference and is an index representing a degree of similarity used in the field of pattern matching and the like. A numerical value m in Equation (1) is a numerical value representing an output of which times of which a degree of similarity with an n-th output AE(n) among 12 times of accumulation of electric charge is to be calculated. For this reason, SAD(m) is an equation for calculating a degree of similarity with an output after elapse of m×t seconds. As can be understood from Equation (1) described above, as the degree of similarity becomes higher, the value of SAD(m) becomes smaller.

For example, under a light source of a 1000 Hz flicker, a period in changes in the light quantity of the flicker is about 1 ms, and when a detection period t of the flicker is set to 0.167 ms, a relationship between the period of changes in the light quantity and the detection period is 1/0.167≈6. Thus, the same output can be acquired with 6 periods regardless of a timing for accumulation of electric charge, and a relation of AE(n) AE(n+6) is formed. From this property, when SAD(6) is calculated under a light source of a 1000 Hz flicker, SAD(6) 0.

Furthermore, in order to detect presence of a 1000 Hz flicker, SAD(3) is additionally calculated. SAD(3) is a value acquired by calculating a degree of similarity with an output after elapse of 0.167×3=0.5 ms. Under a light source of a 1000 Hz flicker, measured light values of timings having a difference of 0.5 ms are in the relation of opposite phases, and thus SAD(3) is a value that is much larger than SAD(6). In other words, in a case in which SAD(3) becomes larger, and SAD(6) becomes smaller, it is assumed that a flicker corresponding to the period of changes in the light quantity of 1000 Hz may occur (may be present).

By integrating results of determination of presence/absence of occurrence of a flicker relating to each period of changes in the light quantity described above, final flicker detection is performed. A period of the flicker detected using the technique described above is used for photographing a still image at a peak timing of the flicker and the like.

As above, the overall control/arithmetic operation unit 101 accumulates electric charges in a unit time that is a time shorter than the period of a high-frequency flicker that is a detection target in accumulation periods of timings different for unit pixels 300 disposed in a plurality of different rows of the pixel area PA. At this time, a total time of the accumulation periods is controlled to be a predetermined time that is a time longer than the period of the high-frequency flicker.

Then, presence/absence of a flicker is detected on the basis of the value of the degree of similarity described above for values acquired by reading electric charges accumulated in accumulation periods of different timings. In accordance with this, a high-frequency flicker can be detected in accordance with a small number of times of exposure and reading. In addition, by plotting the plane average, the period of the high-frequency flicker can be detected as well.

In addition, in this embodiment, the pixel area PA is divided into a plurality of groups configured by dividing the pixel area into predetermined numbers of rows of the unit pixels 300. For the unit pixels 300 of predetermined rows corresponding to different groups among a plurality of groups, electric charges is accumulated for the unit time in accumulation periods of the same timing.

In addition, the unit pixels 300 disposed in a plurality of different rows in each group among the plurality of groups accumulate electric charges during a unit time in accumulation periods of mutually-different timings. In accordance with this, in the pixel area PA, parts in which electric charges is accumulated in accumulation periods of the same timing can be distributed, and an average of the light quantity of the entire screen can be acquired. In addition, an accuracy of detection of a flicker is improved.

In this embodiment, although the pixel area PA is configured to be divided for every unit pixels 300 of 12 lines when the pixel area is divided into a plurality of groups, the configuration is not limited thereto. The number of groups dividing the pixel area PA and the number of predetermined rows for each group may be appropriately set. At this time, it is preferable that the numbers of predetermined rows for respective groups be the same.

Here, in order to detect presence/absence of a flicker, the overall control/arithmetic operation unit 101 sets a period of a flicker that is a detection target in advance. The period of the flicker set here may be set by the overall control/arithmetic operation unit 101 such that it is changed for every predetermined frames, or a user may set a period of the flicker that is desired to be detected. The method of setting the period of the flicker is not limited thereto.

Second Embodiment

In the first embodiment, when a plane average value used for determining a period of changes in the light quantity is acquired, a method for acquiring the plane average value in a single frame is employed. In this embodiment, a method for acquiring a plane average value used for determining a period of changes in the light quantity in a plurality of frames that are consecutive is employed.

Figure 10:
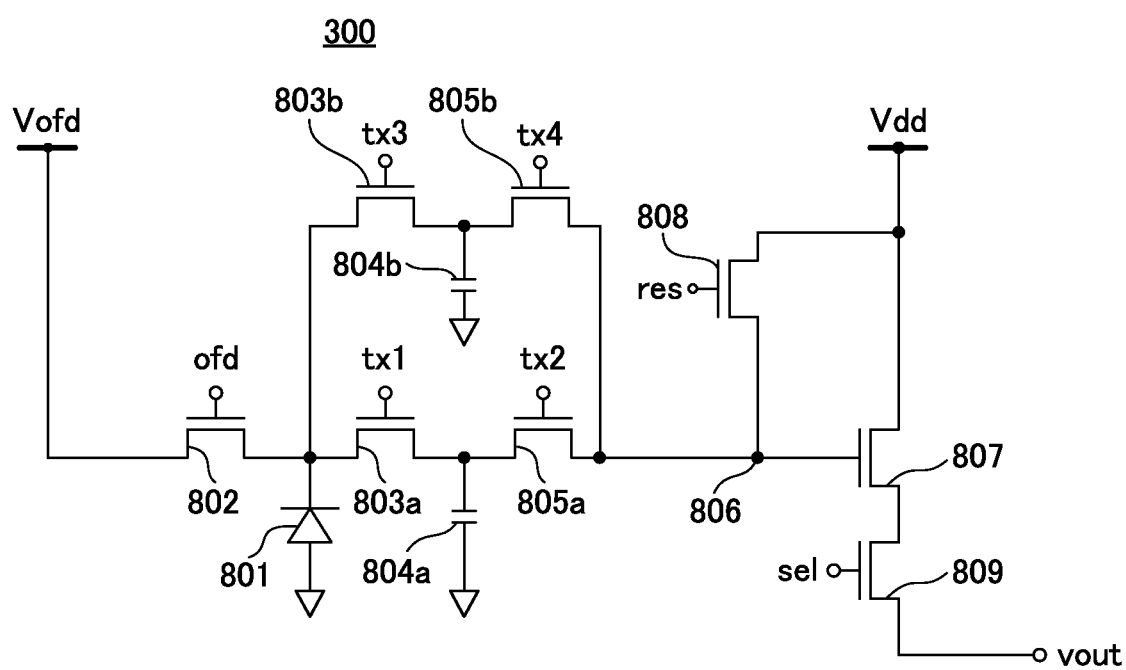
FIG. 10 is a circuit configuration diagram of a unit pixel (one pixel) of an imaging element according to a second embodiment.

FIG. 10 is a circuit configuration diagram of a unit pixel 300 (one pixel) of an imaging element according to a second embodiment. A PD 801 of the pixel performs photoelectric conversion of an incident optical signal (optical image) and accumulates electric charge corresponding to an amount of exposure. In a case in which a control signal tx1 or tx3 becomes a high level, a transmission gate 803a or 803b transmits electric charge accumulated in the PD 801 to a MEM unit 804a or 804b. In this embodiment, a plurality of MEM units are configured to be included. The MEM unit 804a or 804b is an electric charge holding unit used for temporarily holding electric charge accumulated in the PD 801.

In a case in which a control signal tx2 or tx4 becomes the high level, a transmission switch 805a or 805b transmits electric charge maintained in the MEM unit 804a or 804b to a FD unit 806. The FD unit 806 is connected to a gate of an amplifier 807 and converts an amount of electric charge transmitted from the PD 801 into a voltage quantity.

An FD reset switch 808 is a switch used for resetting the FD unit 806. In a case in which a control signal res becomes the high level, the FD reset switch 808 resets the FD unit 806. In addition, in a case in which a control signal ofd becomes the high level, a reset switch 802 becomes on. In accordance with this, the electric charge of the PD 801 is reset. In a case in which a control signal sel becomes the high level, a pixel selection switch 809 outputs a pixel signal that has been converted into a voltage by the FD and has been amplified by the amplifier 807 to an output vout of the unit pixel 300 (pixel).

Referring back to FIG. 3, in this embodiment, a vertical scanning circuit 301 supplies control signals such as signals ofd, res, tx1, tx2, tx3, tx4, and sel controlling transistors of each unit pixel 300 to the unit pixel 300. Such control signals are common for each row of the pixel area PA. Control signals of an n-th scanning line (hereinafter referred to as an n-th line) that has been selected to be scanned by the vertical scanning circuit 301 will be denoted as φFDn, φRESn, φTX1n, φTX2n, φTX3n, φTX4n, and φSELn.

An output vout of each pixel is connected to a column common reading circuit 305 through a vertical output line 302 for each column. The vertical output line 302 is disposed for each column, and outputs vout of the unit pixels 300 corresponding to one column are connected thereto. A current source 304 is connected to the vertical output line 302, and a source follower circuit is configured using the current source 304 and the amplifiers 807 of the unit pixels 300 connected to the vertical output line 302.

Outputs of the column common reading circuits 305 are connected to horizontal transmission switches 306. The horizontal transmission switch 306 is a switch for selecting pixel data (a pixel signal) read from the column common reading circuit 305 and is driven by a horizontal scanning circuit 307. The pixel data selected by the horizontal scanning circuit 307 is amplified by an output amplifier 308 and is output from the imaging element A 106.

Figure 11:
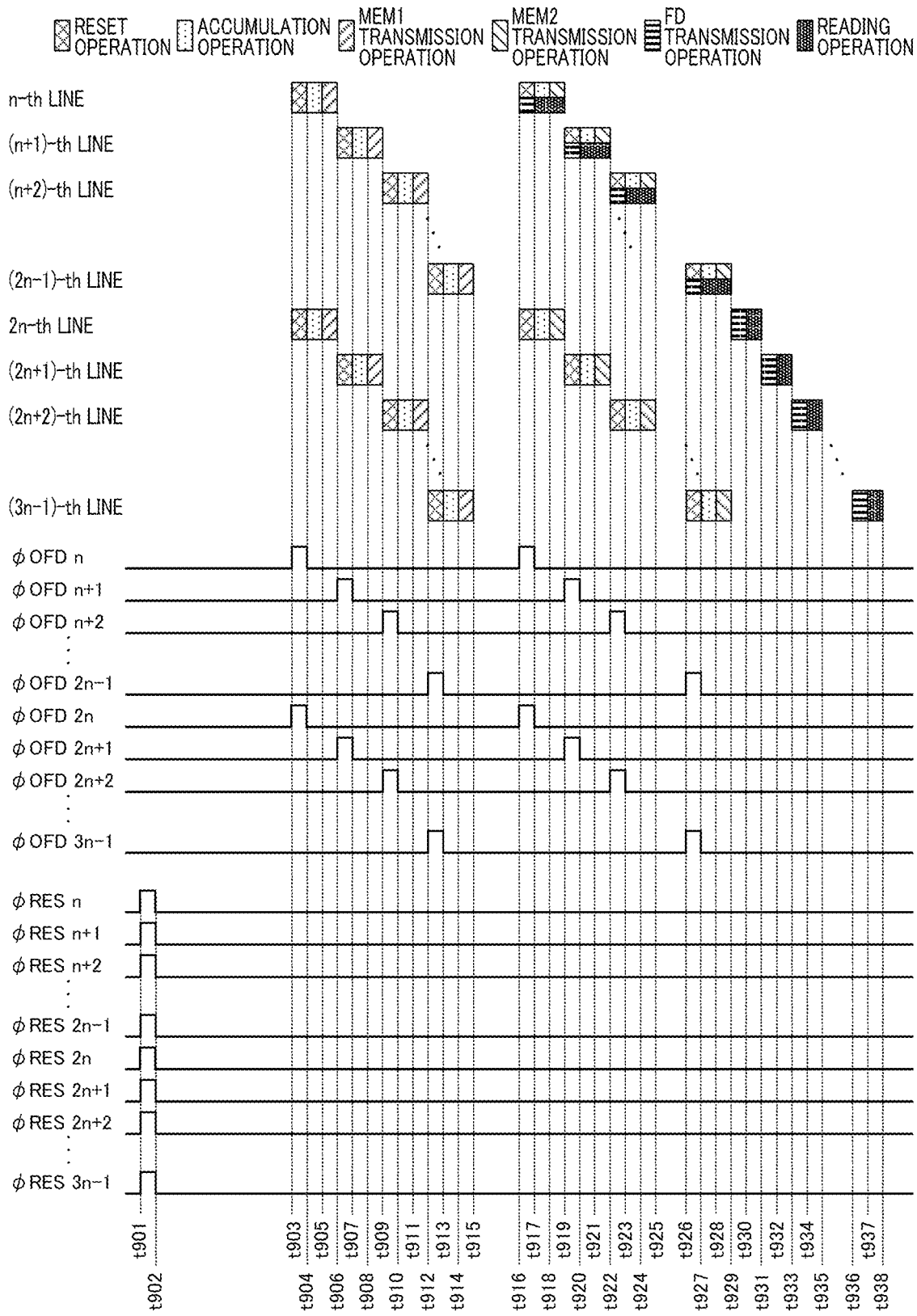
FIG. 11 is a timing diagram of a method of driving an imaging element according to the second embodiment.
Figure 12:
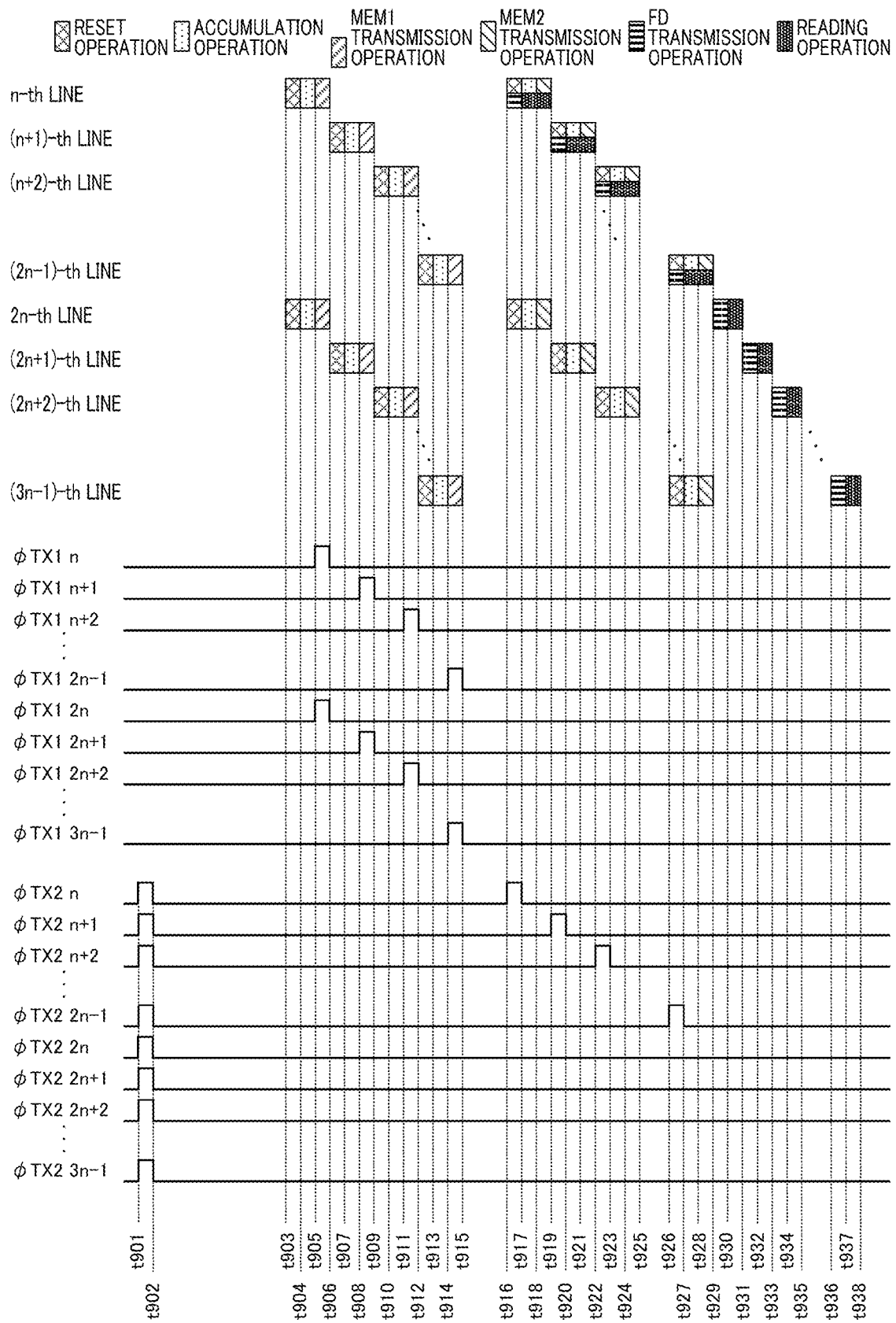
FIG. 12 is a timing diagram of a method of driving an imaging element according to the second embodiment.
Figure 13:
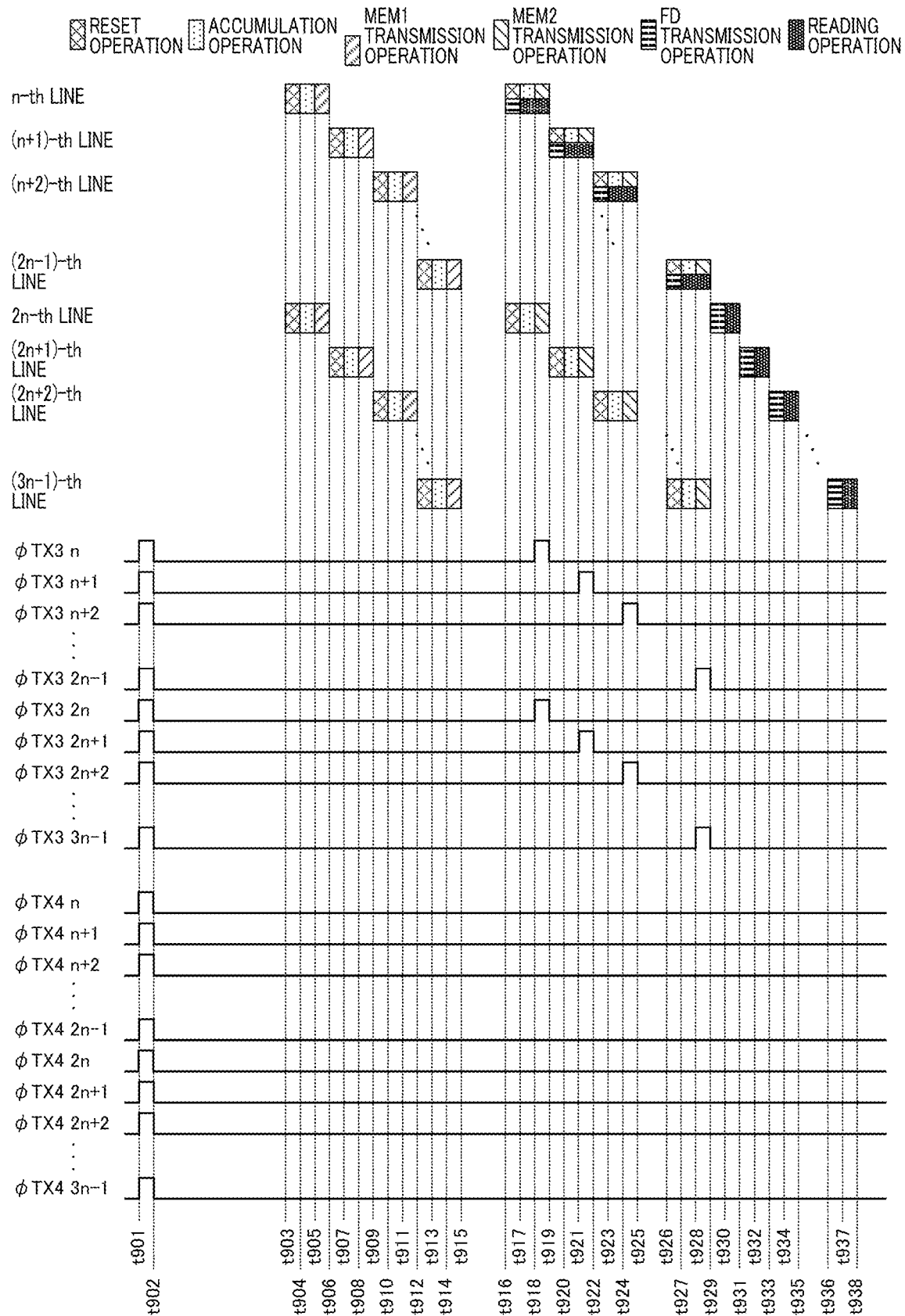
FIG. 13 is a timing diagram of a method of driving an imaging element according to the second embodiment.
Figure 14:
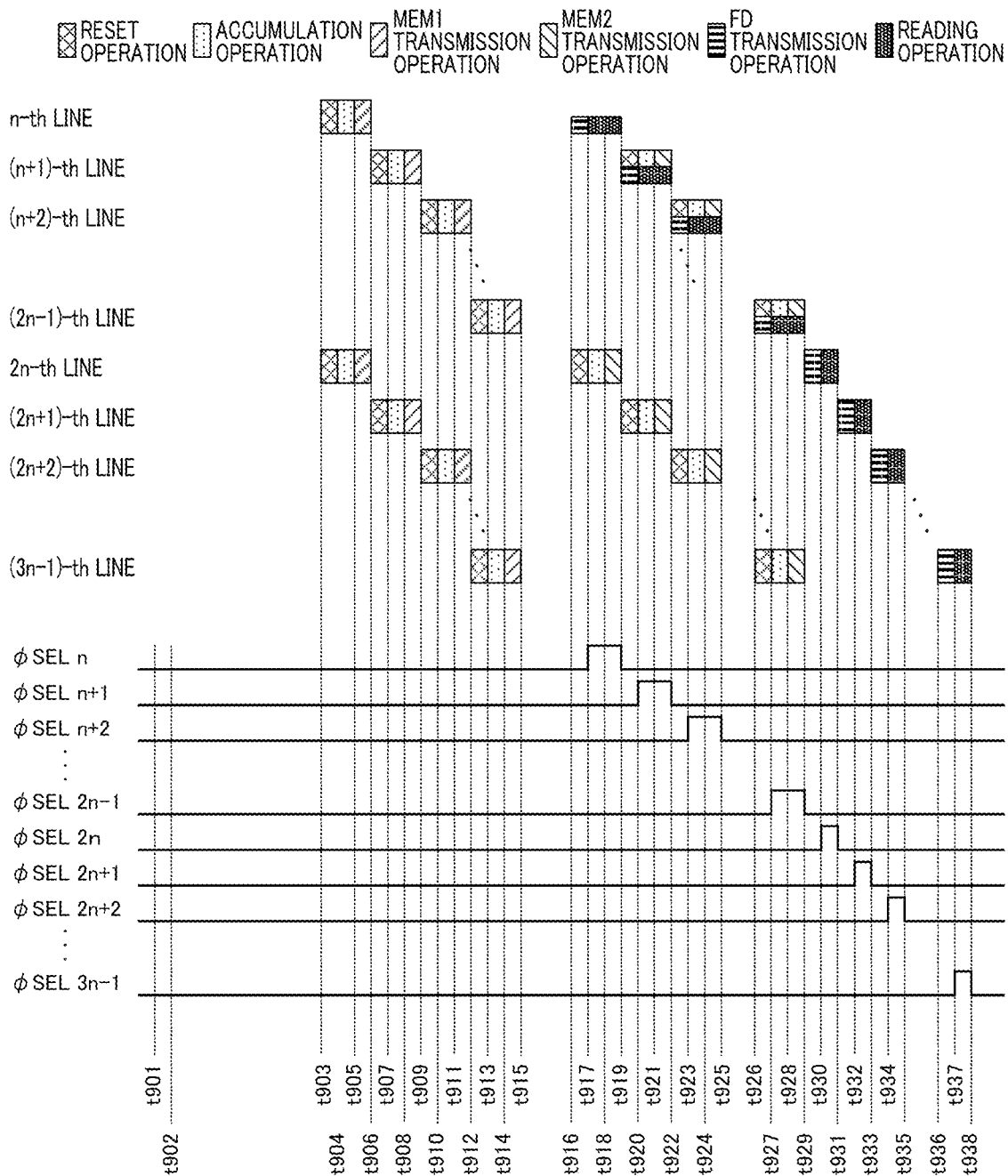
FIG. 14 is a timing diagram of a method of driving an imaging element according to the second embodiment.

Next, operations of the imaging element A 106 according to a driving system of this embodiment from start of accumulation of electric charge to reading of image data will be described with reference to FIGS. 11 to 14. FIGS. 11 to 14 are timing diagrams of a method of driving an imaging element according to the second embodiment. FIG. 11 illustrates control signals φFD and φRES, FIG. 12 illustrates control signals φTX1 and φTX2, FIG. 13 illustrates control signals φTX3 and φTX4, and FIG. 14 illustrates a control signal φSEL.

Between times t901 and t902, pulses of the control signals φRES, φTX2, and φTX4 of all the lines are applied, and the transmission switch 805a, the transmission switch 805b, and the reset switch 808 become on. In accordance with this, unnecessary electric charge accumulated in the MEM units 804a, the MEM units 804b, and the FD units 806 of all the lines is eliminated, and a reset operation is performed.

At the time t902, application of the pulses of the control signals φRES, φTX2, and φTX4 is released, and the transmission switch 805a, the transmission switch 805b, and the reset switch 808 become off.

Between times t903 and t904, pulses of the control signals φFDn and φFD2n are applied, and the reset switch 802 becomes on.

At the time t904, application of the pulses of the control signals φFDn and φFD2n is released, the reset switch 802 becomes off, and an operation of accumulating electric charge generated in the PDs 801 of the n-th line and the 2n-th line starts.

Between times t905 and t906, pulses of control signals φTX1n and φTX1_2n are applied, the transmission switch 803a becomes on, and a MEM transmission operation of transmitting electric charge accumulated in the PD 801 to the MEM unit 804a is performed.

Between times t906 and t907, pulses of control signals φFDn+1 and φFD2n+1 are applied, and the reset switch 802 becomes on.

At the time t907, application of the pulses of control signals φFDn+1 and φFD2n+1 is released, the reset switch 802 becomes off, and an operation of accumulating electric charge generated in the PDs 801 of the (n+1)-th line and the (2n+1)-th line starts.

Between times t908 and t909, pulses of control signals φTX1_n+1 and φTX1_2n+1 are applied, the transmission switch 803a becomes on, and a MEM transmission operation of transmitting electric charge accumulated in the PD 801 to the MEM unit 804a is performed.

Between times t909 and t910, pulses of control signals φFDn+2 and φFD2n+2 are applied, and the reset switch 802 becomes on.

At the time t910, application of the pulses of the control signals φFDn+2 and φFD2n+2 is released, the reset switch 802 becomes off, and an operation of accumulating electric charge generated in the PDs 801 of the (n+2)-th line and the (2n+2)-th line starts.

Between times t911 and t912, pulses of the control signals φTX1_n+2 and φTX1_2n+2 are applied, the transmission switch 803a becomes on, and a MEM transmission operation of transmitting electric charge accumulated in the PD 801 to the MEM unit 804a is performed.

By repeating the operations described above from the n-th line to the (2n−1)-th line, driving for accumulating electric charge in the same period for every predetermined lines and accumulating electric charge in a different period for each line can be realized.

Next, reading of the electric charge transmitted to the MEM unit 804a in the driving described above and an operation of accumulating electric charge in the PD 801 and transmitting the electric charge to the MEM unit 804b are performed in parallel.

At a time t916, at the same time, pulses of the control signals φFDn and φFD2n are applied, and the reset switch 802 becomes on. In addition, a pulse of the control signal φTX2_n is applied, the transmission switch 805a becomes on, and an FD transmission operation of transmitting electric charge maintained in the MEM unit 804a to the FD 806 is performed.

At the time t917, application of the pulses of the control signals φFDn and φFD2n is released, the reset switch 802 becomes off, and an operation of accumulating electric charge generated in the PDs 801 of the n-th line and the 2n-th line starts. In addition, at the same time, the application of the pulse of the control signal φTX2_n is released, the pulse of the control signal φSELn is applied, and the selection switch 809 becomes on.

In accordance with this, the electric charge maintained in the FD 806 is converted into a voltage, is output to a reading circuit as pixel data (a pixel signal), and is sequentially output by the horizontal scanning circuit 307. Then, reading of pixel data from pixels in the n-th line is completed.

Between times t918 and t919, pulses of control signals φTX3_n and φTX3_2n are applied, the transmission switch 803b becomes on, and a MEM transmission operation of transmitting electric charge accumulated in the PD 801 to the MEM unit 804b is performed.

At a time t919, at the same time, pulses of the control signals φFDn+1 and φFD2n+1 are applied, and the reset switch 802 becomes on. In addition, a pulse of the control signal φTX2_n+1 is applied, the transmission switch 805a becomes on, and an FD transmission operation of transmitting electric charge maintained in the MEM unit 804a to the FD 806 is performed.

At the time t920, application of the pulses of the control signals φFDn+1 and φFD2n+1 is released, the reset switch 802 becomes off, and an operation of accumulating electric charge generated in the PDs 801 of the (n+1)-th line and the (2n+1)-th line starts. In addition, at the same time, the application of the pulse of the control signal φTX2_n+1 is released, the pulse of the control signal φSELn+1 is applied, and the selection switch 809 becomes on.

In accordance with this, the electric charge maintained in the FD 806 is converted into a voltage, is output to a reading circuit as pixel data (a pixel signal), and is sequentially output by the horizontal scanning circuit 307. Then, reading of pixel data from pixels in the n-th line is completed.

Between times t921 and t922, pulses of control signals φTX3_n+1 and φTX3_2n+1 are applied, the transmission switch 803b becomes on, and a MEM transmission operation of transmitting electric charge accumulated in the PD 801 to the MEM unit 804b is performed.

By repeating the operations described above from the n-th line to the (3n−1)-th line, sequential reading of pixel data is completed. In addition, by repeating the operations described above from the n-th line to the (2n−1)-th line, driving for accumulating electric charge in the same period for every predetermined lines and accumulating electric charge in a different period for each line can be realized. By performing the reading operation and the accumulation operation in parallel, a plane average value used for determining a period of changes in the light quantity in a plurality of consecutive frames can be acquired.

In this embodiment, although reading and accumulation are performed at the same time as an example, such a time is not limited thereto, and various modifications and changes can be made within the range of the concept thereof.

As a unique effect of the second embodiment, even in a case in which the period of the flicker is long, a plurality of electric charge holding units are arranged in parallel. In accordance with this, for example, in a case in which there are two electric charge holding units, while electric charges is maintained in one electric charge holding unit, electric charges can be read from the other electric charge holding unit. For this reason, a plane average value used for determining a period of changes in the light quantity in a plurality of consecutive frames can be acquired, and a flicker can be detected.

In this embodiment, although the plurality of electric charge holding units are arranged in parallel in the unit pixel 300, the configuration is not limited thereto, and the plurality of electric charge holding units may be arranged in series. Also in such a case, in a case in which electric charge is accumulated over a plurality of frames, the electric charges can be accumulated continuously in time over the plurality of frames.

Third Embodiment

In the second embodiment, when a plane average value used for determining a period of changes in the light quantity in a plurality of frames is acquired, a system in which accumulation and reading of electric charges are performed in the same row in a plurality of consecutive frames is employed. In this embodiment, a system in which, although a plane average value is extracted in a plurality of consecutive frames, accumulation and reading are performed at the same time in mutually-exclusive lines is employed.

Figure 15:
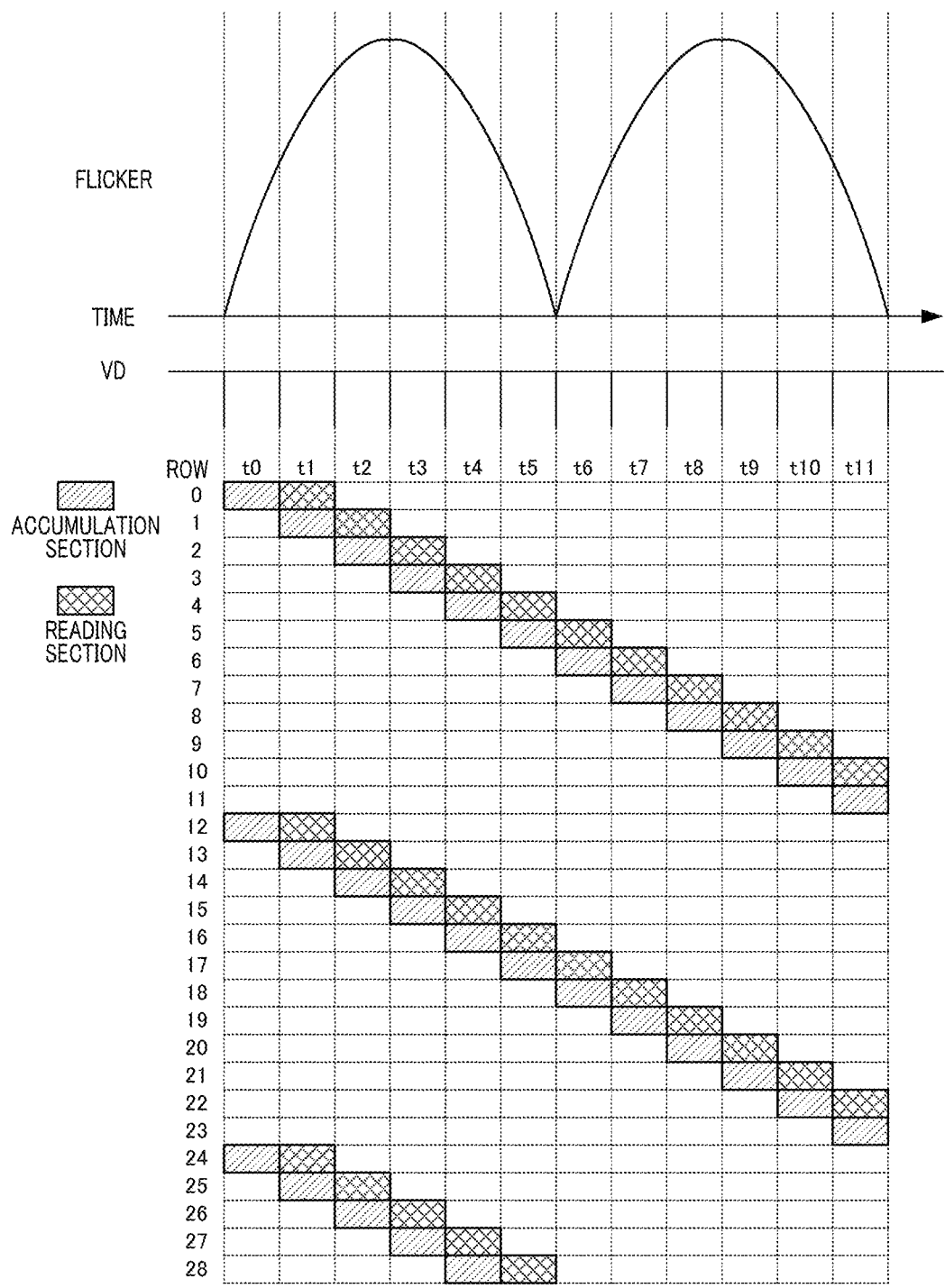
FIG. 15 is a diagram illustrating a change in the quantity of light of a flicker, an accumulation timing, and a reading timing according to a third embodiment.

FIG. 15 is a diagram illustrating a change in the quantity of light of a flicker, an accumulation timing, and a reading timing according to the third embodiment. In this embodiment, electric charge is accumulated in accumulation periods of the same timing in a plurality of lines for every n lines in a global shutter system, and electric charge is accumulated in accumulation periods of different timings for each line within the n lines. FIG. 15 illustrates a case in which electric charges is accumulated at the same time for every 12 lines. The accumulation periods are t0 to t11, and accumulation times are the same and are assumed to be t seconds.

In this embodiment, a vertical synchronization signal VD is issued by dividing image data for every t seconds as one frame, and an accumulation line is read in a frame next to the accumulation. In addition, accumulation of electric charge of the next frame is performed in an accumulation period of the same timing. In other words, in the same frame, accumulation and reading of electric charges for mutually different lines are performed at the same time.

In the accumulation period t0, accumulation for lines $12n$ (here, n=0, 1, 2, . . . ) is performed. In the accumulation period t1, reading is performed for the lines $12n$ (here, n=0, 1, 2, . . . ), and accumulation for the lines $12n+1$ (here, n=0, 1, 2, . . . ) is further performed.

FIG. 15 illustrates a relation of performing reading for lines $12n+m-1$ (here, n=0, 1, 2, . . . ) and further performing accumulation for lines $12n+m$ (here, n=0, 1, 2, . . . ) in an accumulation period tm.

As a unique effect of the third embodiment, accumulation and reading of electric charges for mutually different lines are performed at the same time in a plurality of consecutive frames. In accordance with this, compared to the related art, information of the entire screen can be acquired. For this reason, by increasing the amount of information used for determining a period of changes in the light quantity, an accuracy of detection of the flicker can be improved.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-047468, filed Mar. 22, 2021, which is hereby incorporated by reference wherein in its entirety.

What is claimed is:

1. An imaging apparatus comprising:
an imaging element configured to have a pixel area in which a plurality of unit pixels each including a light receiving unit accumulating electric charges in accordance with an amount of received light and an electric charge holding unit holding the electric charges accumulated by the light receiving unit are arranged in a matrix pattern; and
a controller configured to detect presence or absence of a flicker in a captured image on the basis of image data output from the imaging element,
wherein the controller divides the pixel area into a plurality of groups each consisting of a plurality of rows, causes the light receiving units of corresponding rows of different groups in the plurality of groups to accumulate the electric charges for a unit time that is shorter than a flicker period in accumulation periods of same timing, causes the light receiving units of a plurality of different rows of same group in the plurality of groups to respectively accumulate the electric charges for the unit time in accumulation periods of mutually-different timings, and performs control such that a total time of the accumulation periods in which the light receiving units of the plurality of different rows of the same group accumulate the electric charges is a predetermined time longer than the flicker period.

2. The imaging apparatus according to claim 1, wherein the controller detects the flicker period on the basis of an average value of values acquired by reading the electric charges accumulated in the accumulation periods of the same timing and an average value of values acquired by reading the electric charges accumulated in the accumulation periods of the different timings.

3. The imaging apparatus according to claim 1, wherein each of the plurality of groups is formed in rows of the light receiving units, which are consecutive, such that the numbers of the rows of the light receiving units are the same.

4. The imaging apparatus according to claim 1, wherein, when the electric charges is accumulated in the accumulation periods of the different timings, at times adjacent to each other, the electric charges of the rows of the light receiving units adjacent to each other is accumulated.

5. The imaging apparatus according to claim 1, wherein the predetermined time is an integer multiple of the unit time.

6. The imaging apparatus according to claim 1, wherein the predetermined time is a time that is twice the flicker period or more.

7. The imaging apparatus according to claim 6, wherein the controller accumulates the electric charges over a plurality of frames in a case in which the predetermined time is a time shorter than twice the flicker period.

8. The imaging apparatus according to claim 1, wherein the unit pixel includes a plurality of electric charge holding units.

9. The imaging apparatus according to claim 8, wherein the plurality of electric charge holding units are arranged in parallel in the light receiving unit.

10. The imaging apparatus according to claim 8, wherein the controller performs control such that the electric charges is accumulated in the light receiving unit over a plurality of frames, and accumulation of the electric charges and reading of the electric charges in different rows are performed in same frame.

11. A method for controlling an imaging apparatus, which performs control for an imaging element configured to have a pixel area in which a plurality of unit pixels each including a light receiving unit generating and accumulating electric charges in accordance with an amount of received light and an electric charge holding unit holding the electric charges generated and accumulated by the light receiving unit are arranged in a matrix pattern, the method comprising:

dividing the pixel area into a plurality of groups each consisting of a plurality of rows;

causing the light receiving units of corresponding rows of different groups in the plurality of groups to accumulate the electric charges for a unit time that is shorter than a flicker period in accumulation periods of same timing, causing the light receiving units of a plurality of different rows of same group in the plurality of groups to respectively accumulate the electric charges for the unit time in accumulation periods of mutually-different timings, and performing control such that a total time of the accumulation periods in which the light receiving units of the plurality of different rows of the same group accumulate the electric charges is a predetermined time longer than the flicker period; and detecting presence or absence of a flicker in a captured image on the basis of image data output from the imaging element.

12. A non-transitory storage medium storing a computer program related to a method for controlling an imaging apparatus, which performs control for an imaging element configured to have a pixel area in which a plurality of unit pixels each including a light receiving unit generating and accumulating electric charges in accordance with an amount of received light and an electric charge holding unit holding the electric charges generated and accumulated by the light receiving unit are arranged in a matrix pattern, the method comprising:

dividing the pixel area into a plurality of groups each consisting of a plurality of rows;

causing the light receiving units of corresponding rows of different groups in the plurality of groups to accumulate the electric charges for a unit time that is shorter than a flicker period in accumulation periods of same timing, causing the light receiving units of a plurality of different rows of same group in the plurality of groups to respectively accumulate the electric charges for the unit time in accumulation periods of mutually-different timings, and performing control such that a total time of the accumulation periods in which the light receiving units of the plurality of different rows of the same group accumulate the electric charges is a predetermined time longer than the flicker period; and detecting presence or absence of a flicker in a captured image on the basis of image data output from the imaging element.

* * * * *